United States Patent [19]
Yanagida et al.

[11] Patent Number: 5,379,644
[45] Date of Patent: Jan. 10, 1995

[54] STRAIN OR STRESS GAUGE AND METHOD FOR DETECTING STRAIN OR STRESS OF STRUCTURE USING THE SAME, AND PLASTIC COMPOSITE MATERIAL FOR FOREKNOWING PROGRESS OF BREAKDOWN OF STRUCTURE AND METHOD USING THE SAME

[75] Inventors: Hiroaki Yanagida, Chofu; Masaru Miyayama, Kawasaki; Norio Muto, Sagamihara; Minoru Sugita, Tokyo; Teruyuki Nakatsuji, Tokyo; Yasushi Otsuka, Tokyo, all of Japan

[73] Assignees: Shimizu Costruction Co., Ltd., Tokyo; Hiroaki Yanagida, Chofu, both of Japan

[21] Appl. No.: 919,526

[22] Filed: Jul. 24, 1992

[30] Foreign Application Priority Data

Aug. 15, 1991 [JP] Japan .................................. 3-205303
Aug. 15, 1991 [JP] Japan .................................. 3-205304

[51] Int. Cl.⁶ ............................ G01B 7/16; G01L 1/18
[52] U.S. Cl. ............................................. 73/787; 73/768
[58] Field of Search ................ 73/787, 768, 775, 802; 338/2, 5, 6

[56] References Cited

U.S. PATENT DOCUMENTS

| | | | |
|---|---|---|---|
| 3,596,269 | 7/1971 | Laska | 73/775 X |
| 3,738,162 | 6/1973 | Dally et al. | 73/787 X |
| 3,779,071 | 12/1973 | Thomas, Jr. et al. | 73/787 X |

FOREIGN PATENT DOCUMENTS

| | | | |
|---|---|---|---|
| 2068562 | 8/1981 | United Kingdom | G01L 1/22 |
| 2180940 | 4/1987 | United Kingdom | G01N 27/04 |

*Primary Examiner*—Hezron E. Williams
*Assistant Examiner*—James M. Olsen
*Attorney, Agent, or Firm*—Darby & Darby

[57] ABSTRACT

A strain or stress gauge 1A is presented for measuring the stress of a structure or a member. The gauge 1A comprises a bundle of electric conductive fibers 3, and a pair of terminals 4, for measuring an electric resistance of the bundle of electric conductive fibers provided on both ends thereof. It presents a strain or stress gauge having a simple structure, which can be produced inexpensively, and its size can be chosen freely. It is possible to know not only the state of a strain or stress but also the history of stress in a structure or a structural member which, by the characteristics of a specific curve relating the stress/strain relationship of the gauge.

18 Claims, 9 Drawing Sheets

STRAIN OR STRESS GAUGE AND METHOD FOR DETECTING STRAIN OR STRESS OF STRUCTURE USING THE SAME, AND PLASTIC COMPOSITE MATERIAL FOR FOREKNOWING PROGRESS OF BREAKDOWN OF STRUCTURE AND METHOD USING THE SAME

BACKGROUND OF THE INVENTION

1. Field of the Invention

The present invention relates to a strain or stress gauge and a method for detecting strain or stress of a structure using the gauge, and a plastic composite material including a bundle of electrically conductive fibers which has a breakdown foreknowledge mechanism and a method for foreknowing the progress of breakdown of a structure using the same.

Especially, the present invention relates to a strain or stress gauge and a method for detecting strain or stress of a structure using the gauge, which can detect the state or the history of strain or stress of the structure, or which can judge for itself to warn the progress of breakdown of the material or the like, on the basis of the electric resistance value or the changing state thereof in the bundle of the electrically conductive fibers.

2. Related Art

A method using a resistance wire strain gauge has been known as a means for detecting stresses generated in a structural member. The resistance wire strain gauge, as well known, has a meandering-like resistance wire made of platinum or the like. The strain gauge is attached on an external surface of an object to measure the stress thereof. The strain of the object is measured by the resistance change on the basis of the shape change of the resistance wire, i.e., the change of length and-cross sectional area of the resistance wire. The stress is calculated according to the measured strain.

However, according to such a conventional method, there are problems that the strain gauge is expensive and is limited in size. In the strain gauge, there is a linear relationship between load and strain. Therefore, even if a large live load is temporarily applied to the strain gauge, the display indicates zero strain after the live load is removed. If the measurement timing is missed, although the live load in a dangerously high range had been applied to the object and an excessive stress had been produced in the object in fact, a serious problem arose that this fact was not detected by the strain gauge. Furthermore, since the strain gauge has to be provided on the external surface of the object, there is a problem that an accurate internal stress cannot be detected when the object is large.

A FRP (Fiber Reinforced Plastic) composite material, which comprises plastics containing fibers, has been known. The FRP composite material has been used in many industrial fields because of an excellent specific tensile strength. In particular, the composite material has been recently used as a material having not only an excellent specific tensile strength but also a high durability and resistance to environmental factor's, in architecture and civil engineering fields.

However, since the FRP composite material is manufactured by incorporating reinforcing fibers into a matrix (a basic material comprising resin), the properties of the composite material tend to lack of uniformity.

Therefore, it is difficult to obtain a quantitative proof for backing up the strength of the FRP composite material. In this sense, such a conventional composite material is short complete reliability.

SUMMARY OF THE INVENTION

Accordingly, the present invention was developed in view of the above circumstances.

An object of the present invention is to provide a strain or stress gauge (hereinafter referred to as a gauge) which has a simple structure, can be produced relatively inexpensively, can be installed at anywhere on the object and can provide the history of stress even though there are only fragmentary data.

Another object of the invention is to provide a method for detecting strain or stress of a structure using such a gauge.

A further object of the present invention is to provide a plastic composite material including a bundle of fibers which has a breakdown foreknowledge mechanism.

A yet another object of the present invention is to provide a method for foreknowing the progress of breakdown of a structure using the gauge, which can self-diagnose the progress of breakdown of the material.

In order to achieve the above object of the present invention, there is provided a gauge comprising a bundle of electric conductive fibers, and a pair of terminals provided on both ends of the bundle for measuring the electric resistance of the bundle of electric conductive fibers.

The gauge according to the present invention may be provided at a predetermined position of the object, the strain or stress of which is measured. The electric resistance of the bundle of the electric conductive fibers is measured by using the terminals thereof. Consequently, it is possible to detect the strain or stress of the portion at which the gauge is provided, and further to detect the history of the stress thereof.

It is preferable that the bundle of electric conductive fibers in the gauge is a bundle of carbon fibers. Accordingly, it is possible to use the gauge for various purposes, by using usual carbon fibers as electric conductive fibers.

It is preferable that the bundle of electric conductive fibers in the gauge is covered by a resin material. Accordingly, it is possible to make handling of the gauge easy or the like and to attach or embed the gauge to an electric conductive member directly.

Furthermore, in order to achieve the above object of the present invention, there is provided a method for detecting strain or stress of a structure using the above-mentioned gauge, comprising the steps of: attaching or embedding the gauge to the structure, measuring the electric resistance of the bundle of electric conductive fibers, and determining the state or the history of strain or stress in the portion of the structure on which the gauge is provided, on the basis of the measurement value or the change thereof.

According to the method for detecting strain or stress of a structure, it is possible to know the state or the history of strain or stress of the structure by using the above mentioned gauge. Especially, it is possible to detect the inner stress state of the structure directly to obtain more accurate data, by using an embedded gauge.

Furthermore, in order to achieve the above object of the present invention, there is provided a plastic composite material including a bundle of fibers which has a breakdown foreknowledge mechanism comprising a plastic material, a bundle of electric conductive fibers having a predetermined shape, provided inside the plastic material as one body, and a pair of terminals for measuring an electric resistance of the bundle of electric conductive fibers provided on both ends thereof, the pair of terminals being exposed outside the plastic material.

According to the plastic composite material including a bundle of fibers which has a breakdown foreknowledge mechanism of the present invention, it is possible to grasp the state of stress or progress of breakdown of the plastic composite material without destruction, by only measuring the electric resistance of the bundle of electric conductive fibers.

It is preferable that the bundle of electrically conductive fibers in such a plastic composite material doubles as a reinforcing fibers for the plastic material.

Accordingly, it is possible to realize a FRP composite material which fulfill functions similar to that of above-mentioned plastic composite material, by the bundle of electric conductive fibers functioning as a reinforcing fibers for the plastic material.

It is preferable that the bundle of electric conductive fibers in the plastic composite material comprises a bundle of carbon fibers.

Accordingly, it is possible to use the plastic composite material for various purposes, by using a bundle of usual carbon fibers as the bundle of the electric conductive fibers.

It is preferable that the plastic composite material includes not only the bundle of electric conductive fibers but also a bundle of fibers for reinforcing the plastic composite material.

The plastic composite material including a bundle of fibers which has a breakdown foreknowledge mechanism has a construction in which, a bundle of the electric conductive fibers is substantially provided inside the FRP composite material. The FRP composite material may have a construction in which the bundle of electric conductive fibers are ruptured by a stress larger than a predetermined value.

Furthermore, in order to achieve the above object of the present invention, there is provided a method for foreknowing the state of breakdown of a structure which has the above-mentioned plastic composite material, comprising the steps of: measuring the electric resistance of the bundle of electric conductive fibers by using the pair of terminals, and recognizing the progress of breakdown of the plastic composite material including a bundle of fibers on the basis of the measurement value or the change thereof.

According to the method for foreknowing the state of breakdown of a structure, it is possible to grasp the state of stress or progress of breakdown of a structure without destruction. Furthermore, it is unnecessary to provide any stress detecting means such as a strain gauge except the plastic composite material.

DESCRIPTION OF THE PREFERRED EMBODIMENTS

Hereinafter, preferred embodiments of the invention will be explained with reference to the drawings.

Figure 1:
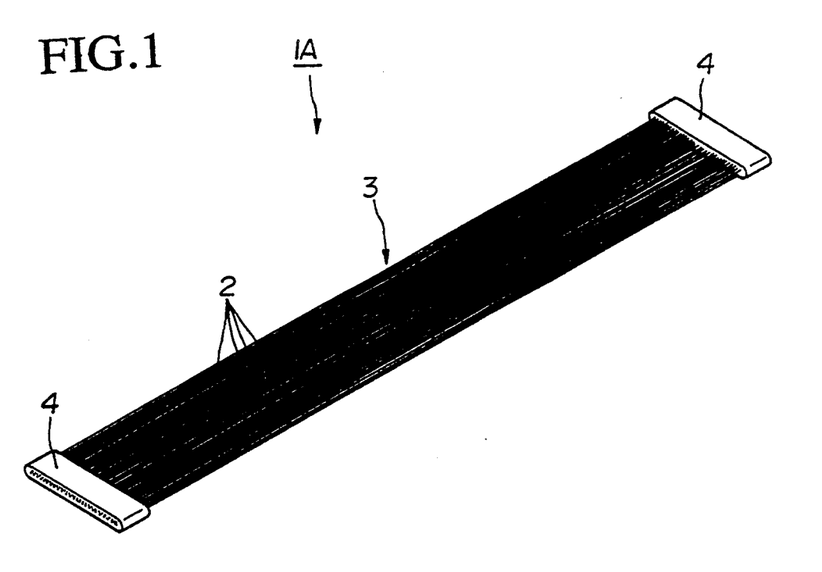
FIG.1 is a perspective view showing an embodiment of the strain or stress gauge according to the present invention.

FIG. 1 shows a strain or stress gauge according to an embodiment of the present invention. The gauge 1A comprises a bundle of carbon fibers (a bundle of electrically conductive fibers) 3 comprising a large number of continuous carbon fibers (continuous fibers having an electric conductivity) 2, 2, . . . , and a pair of terminals 4, 4 for measuring an electric resistance of the bundle of carbon fibers provided on both ends thereof.

In FIG. 1, the terminals 4,4 comprises ribbon-shaped metal plates with an excellent electric conductivity, and are fastened round the bundle of carbon fibers 3. In this case, the terminals 4, 4 has a function which makes the carbon fibers 2, 2, . . . band together.

Figure 2:
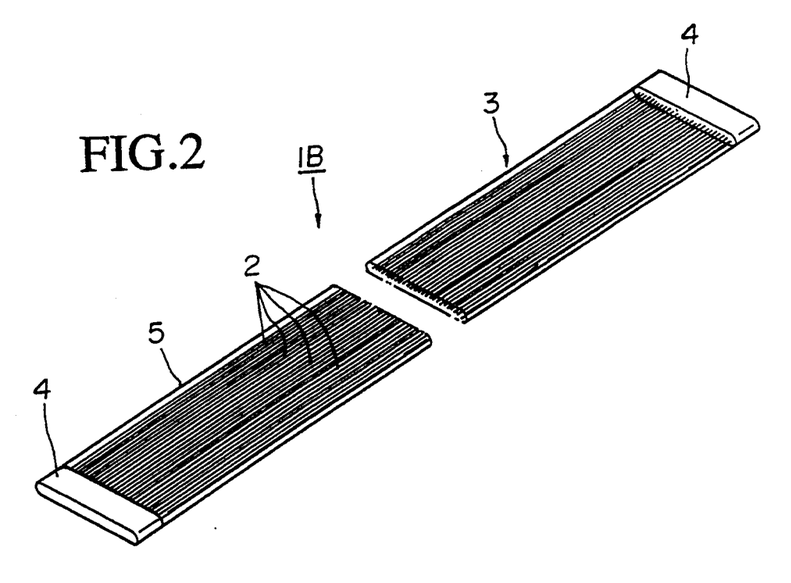
FIG.2 is a partly schematic, perspective view showing another embodiment of the gauge according to the present invention.

FIG. 2 shows a gauge according to another embodiment of the present invention. The gauge 1B has a construction of a bundle of carbon fibers 3 as described in the above embodiment covered by a resin material 5. A pair of terminals 4, 4 are provided on both ends of the bundle of carbon fibers 3. The pair of terminals 4, 4 are exposed.

Next, the function of the gauge having the above described construction and an embodiment of the method for detecting strain or stress of a structure according to the present invention will be explained as follows.

Figure 3:
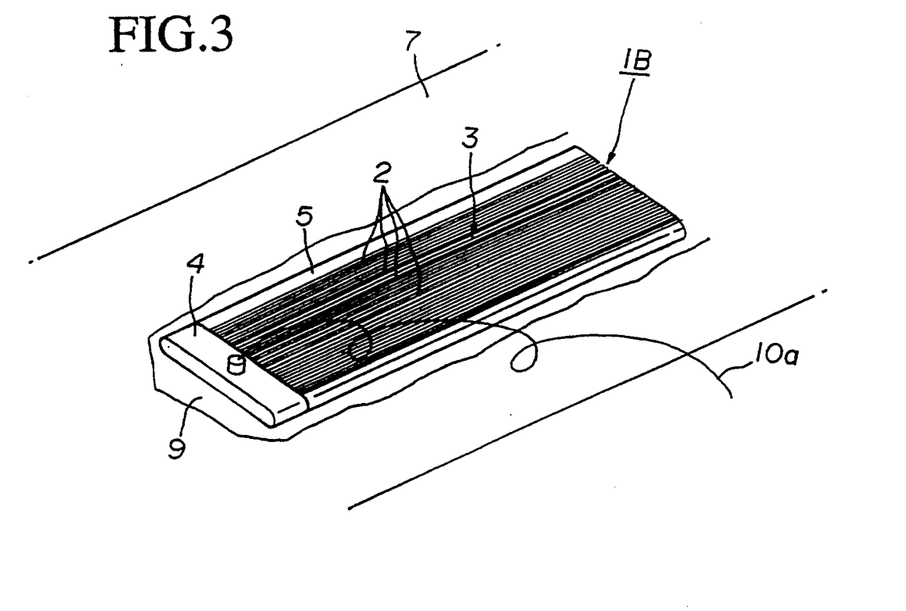
FIG.3 is a partial perspective view showing a state of placement of the gauge according to the present invention.

FIG. 3 shows a structure 7, on a predetermined portion of which the above mentioned gauge 1B is attached. In this FIGURE, the structure 7 may be, for example, a beam 8a of a bridge 8 as shown FIG. 4, a slab of a building, or the like, and is not limited to a specific kind of structure. In this case, the whole back portion of the above mentioned gauge 1B is fixed on the structure 7 using an adhesive 9, as shown in FIG. 3.

Figure 4:
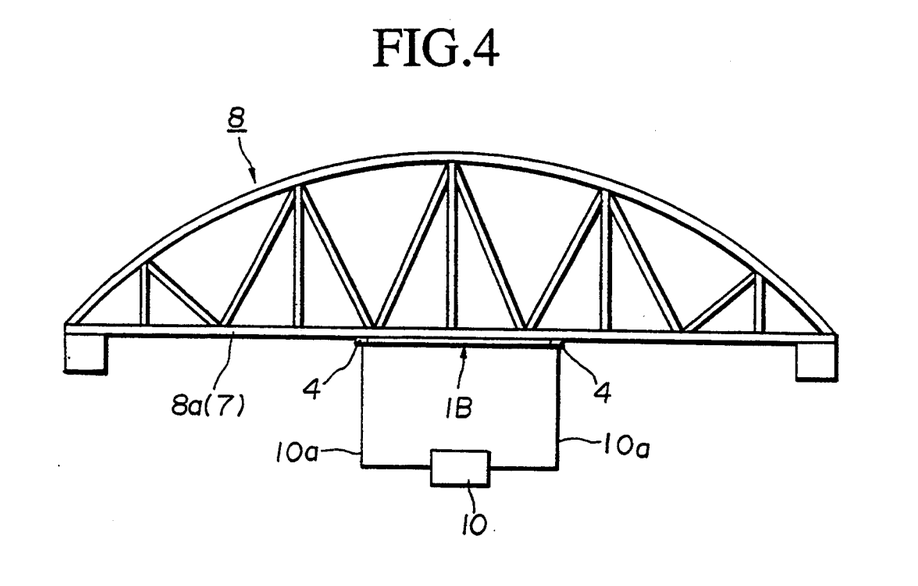
FIG.4 is a front view showing an enforcement mode in the case of using the gauge according to the present invention for detecting strain or stress in the beams of a bridge.

As described above, after the gauge 1B is attached to a predetermined portion of the structure 7, a resistance measuring device 10 (refer to FIG. 4) is connected to the terminals 4, 4. Then, the electric resistance of the bundle of carbon fibers 3 provided between the terminals 4, 4 is measured. In FIGS. 3 and 4, a numeral 10a indicates a wiring connected to the resistance measuring device 10.

In order to clarify the function and principle of the present invention, an example of an experiment carried out by the inventors will be presented below.

Figure 5:
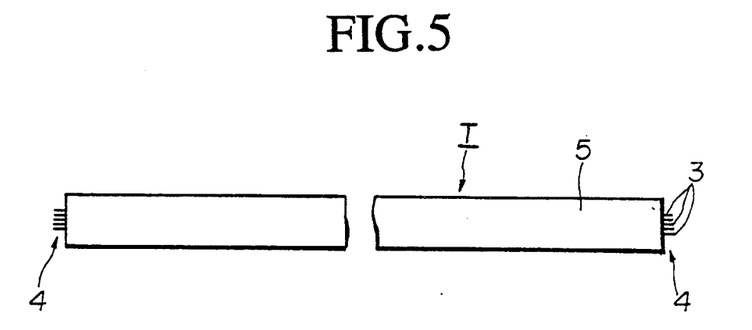
FIG.5 is a partially schematic, front view showing a test piece used for an experiment.
Figure 6:
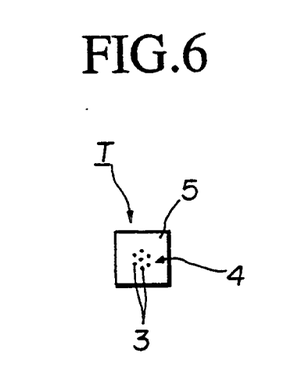
FIG.6 is a side view of FIG. 5.

FIGS. 5 and 6 show a test piece T which was used for the experiment. The test piece T has a structure similar to the aforementioned gauge 1B. The test piece T was pulled under a following experimental condition. The relationship between a load P(t), the deformation of the test piece T, and an electric resistance value $R(\Omega)$, which were caused by the pull, was obtained. In this case, "the deformation" is the amount of change to the original measurement of the test piece, not a non-dimensional strain. However, the amount of deformation is referred to as strain for convenience hereinafter.

(Example)

test piece T
bundle of electric conductive fibers 3: carbon fibers (PAN-high strength type)
bundle of another fibers: glass fibers
resin material 5: vinyl ester resin
size: 8 mm square, length 700 mm
experimental condition
$R_O$ (initial resistance value): 5.6 $\Omega$
room temperature: 23° C.
electric current I: 0.9 mA
voltage: 0.05 mV/cm
pull speed: 1 mm/min.
electric source generator
YEW DC Voltage Current Standard Type 2553

Figure 7:
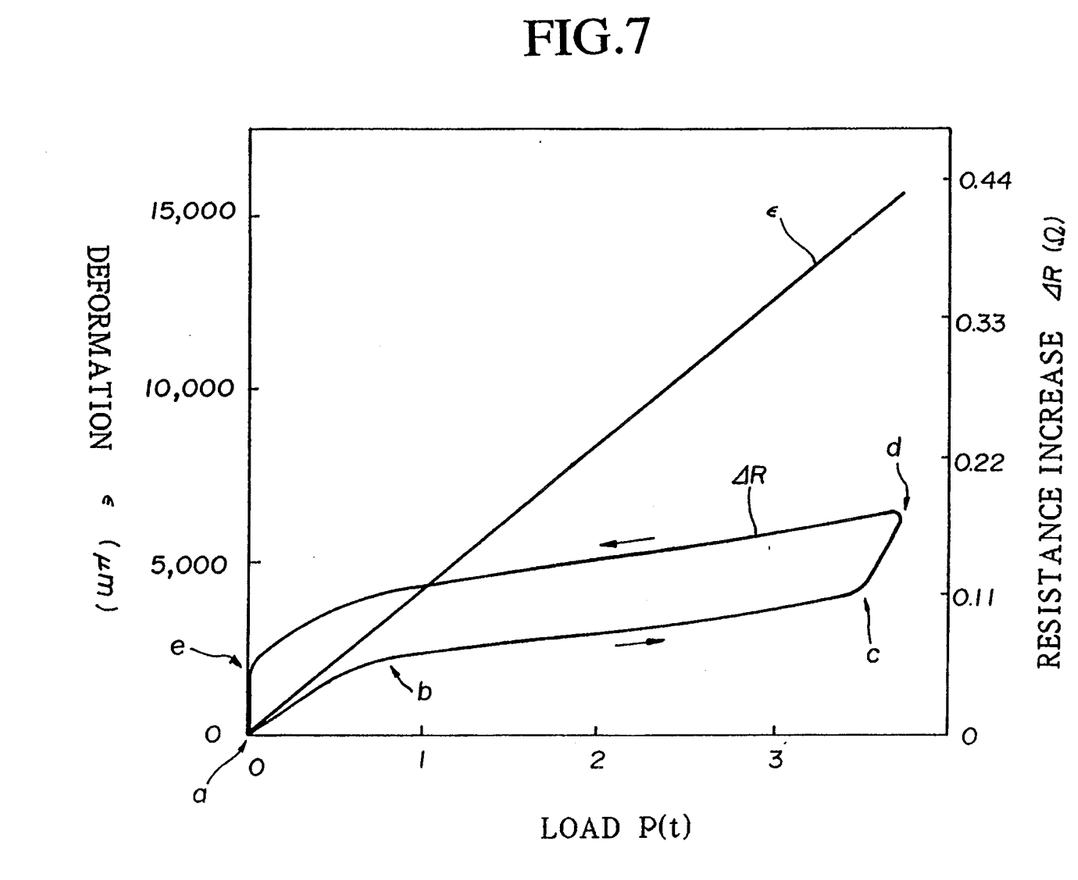
FIG.7 is a graph showing a relationship between the load, the deformation, and the increasing electric resistance of the gauge according to the present invention.

The results of the above mentioned experiment are shown in FIG. 7. In the FIGURE, $\Delta R$ indicates an increase in resistance ($\Omega$) with respect to the initial resistance value $R_O$. In the diagram showing the $\Delta R$, the line which reaches to a point e after passing through a point d at which $\Delta R$ is the highest value, is a curve in the case that the load P is gradually decreased after the amount of strain $\epsilon$ of the test piece T became 1.6 mm (16000 $\mu$m). The test piece T was broken when the amount of strain $\epsilon$ of the test piece T became 1.7 mm by increasing the load P.

According to FIG. 7, it is understood that the electric resistance value R of the bundle of carbon fibers 3 increases gradually, accompanying the increase of the amount of strain $\epsilon$ on the basis of increase of the tensile load P. The electric resistance R changes in three stages which comprise a relatively intensive increase between the points a and b, a moderate increase between the points b and c, and an intensive increase after passing through the point c, accompanying the increase of the load P.

Thereafter, when the load P is removed, it is understood that the resistance value R does not return to the point a, i.e., the initial resistance value $R_O$, to shift to a higher value side on the basis of the point a.

Regarding the above mentioned matter, the inventors have confirmed by an experiment that even if the experimental condition is changed in a different way, the above mentioned tendencies, i.e., the change tendency of resistance value R with the three stages, and the tendency of shift to the higher value side of the resistance value R, are produced when a load is in a higher strain range near the point of tensile rupture. The above mentioned conditions include the amount of the load P, the pull speed, the kind of the electric conductive fibers and the like.

According to the experiment, it has been discovered that the shift amount of the resistance R to the higher strain range after removal of the load, i.e., the value between points a and e, is approximately equal to the amount of the change in the range of higher strain between the points c and d.

Furthermore, after removing the load P completely, when the load is increased to the initial highest strain value again, the resistance value R ($\Delta R$) is increased along the curve between the points e and d. Thereafter, when the load is decreased to be removed, it has been observed that the same curve d-e is traced from the point d to the point e again. Repeated application of the load results in the same curve as the above mentioned curve.

The position of the point c which appears on the curve and the change of the resistance value (the amount of the shift) between the points c and d, may differ according to the intensity and extensibility of the bundle of the electric conductive fibers. For example, the position at which the point c appears is transferred to the side of the high strain region, by the bundle of the electric conductive fibers having a high intensity. The amount of change of the resistance between the points c and d becomes large, by the bundle of the electric conductive fibers having a high intensity and a high extensibility.

It may be considered that the above mentioned phenomenon between the points d and e is caused by a reversible change of structure of the bundle of carbon fibers 3 and that the phenomenon between the points c and d is caused by an irreversible change of structure thereof.

If a single carbon fiber 2 is used in stead of the bundle of carbon fibers 3, an increase of the electric resistance value on the basis of the increase of strain is detected. However, the increase of the electric resistance value in this case is different from the above case of the bundle of carbon fibers 3, and has an almost linear change to the point of tensile rupture. Furthermore, in this case, a clear hysteresis as described above does not appear.

As described in the above example, the gauge 1B attached to the structure 7 indicates a change of the electric resistance R on the basis of the strain of the structure 7. Therefore, it is possible to detect the strain of the structure 7 to know the stress thereof, by measurement of the electric resistance value R of the gauge 1B.

Furthermore, since the gauge 1B indicates a specific change of the electric resistance value R to the amount of strain $\epsilon$, as described above, it is possible to use the gauge as a kind of sensor for informing the state of stress of the structure 7 by using such a characteristic.

For example, it is possible to raise a warning when the electric resistance R becomes the value of the point c (hereinafter referred to as the marking point) in FIG. 7, by relating the rupture strength of the bundle of carbon fibers 3 to the strength of the structure 7.

Furthermore, it is possible to raise a warning when the rupture of the bundle of carbon fibers 3 is detected by setting the rupture strength of the gauge 1B less than the strength of the structure 7. In this case, exchange of the gauge 1B would be required.

When the gauge 1B has been stressed to a point near a high strain and near the point of tensile rupture once, the electric resistance value R of the bundle of carbon fibers 3 shifts to a higher value. Therefore, it is possible to know whether a high strain is generated in the structure 3 or not, and to know the degree thereof in view of the amount of shift, so that the history of stress in the structure can be known.

Therefore, it is possible to know the present stress occurring in the structure, or the maximum stress and the history of stress and the like which were caused by an external force such as an earthquake or the like. Thereby, it is possible to be used for watching the strength of the structure.

In the above description, the function of the gauge 1B in FIG. 2 has been explained. The gauge 1A without a resin material 5, as shown in FIG. 1, has the same function as that of the above mentioned gauge 1B too.

However, when the gauge 1A is attached to the structure 7, it is necessary not to touch the bundle of carbon fibers 3 (and the terminals 4) with the structure 7 directly, with the structure 7 directly, when .the structure 7 does not comprise an insulating material.

Figure 8:
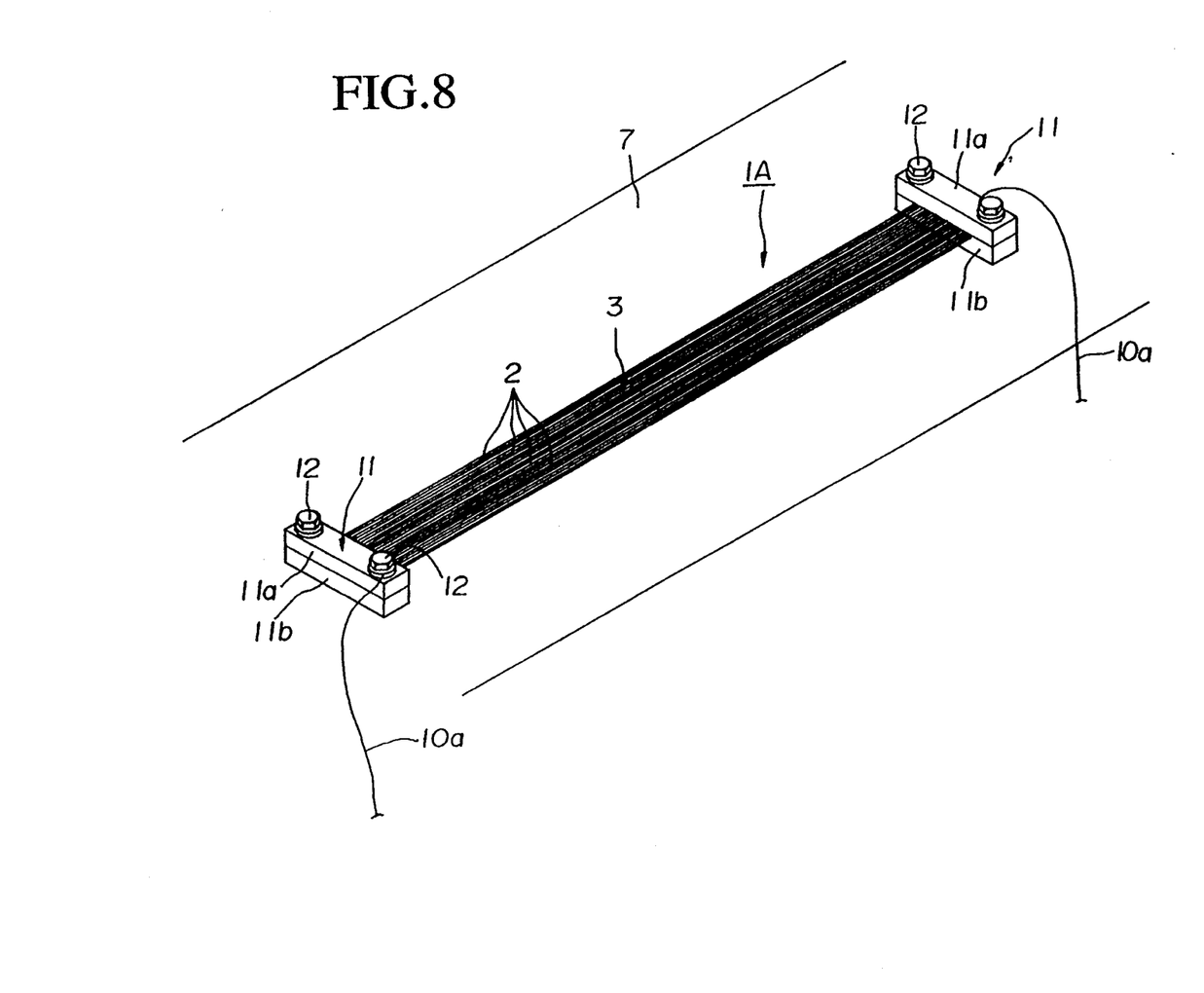
FIG. 8 is a partial perspective view showing another state of placement of the gauge according to the present invention.

Attachment of the gauge can be performed not only by an adhesive attachment method using an insulating adhesive, but also by a fixing method as shown in FIG. 8.

In FIG. 8, numeral 11, 11 indicate fixing jigs for the bundle of carbon fibers 3. The fixing jigs 11 have a construction so that both ends of the bundle of carbon fibers 3 are sandwiched by upper members 11a and lower members 11b. Holes for passing through bolts are provided through the upper members 11a and lower members 11b. The bundle of carbon fibers 3 is fixed to the structure 7 by using bolts 12, 12, . . . so that the bundle of carbon fibers 3 is stretched. The upper members 11a comprise an electric conductive material. The lower members 11b comprise an insulating material. In this case, The upper members 11a, 11a function as terminals 4 for the resistance measurement.

According to such a fixing means, it is possible to attach the above mentioned gauge 1A so that the bundle of carbon fibers 3 does not touch the structure 7, even if the structure 7 comprises an electric conductive material.

The gauge 1B in which the bundle of carbon fibers 3 is covered by the resin material 5, as shown in FIG. 2, has an independent structure. Therefore, the gauge can be conveniently treated as an independent single body. Since the bundle of carbon fibers 3 is protected by the resin material 5, the gauge 1B can be embedded in a structure, e.g., inside a concrete, under the ground or the like, directly.

Figure 9:
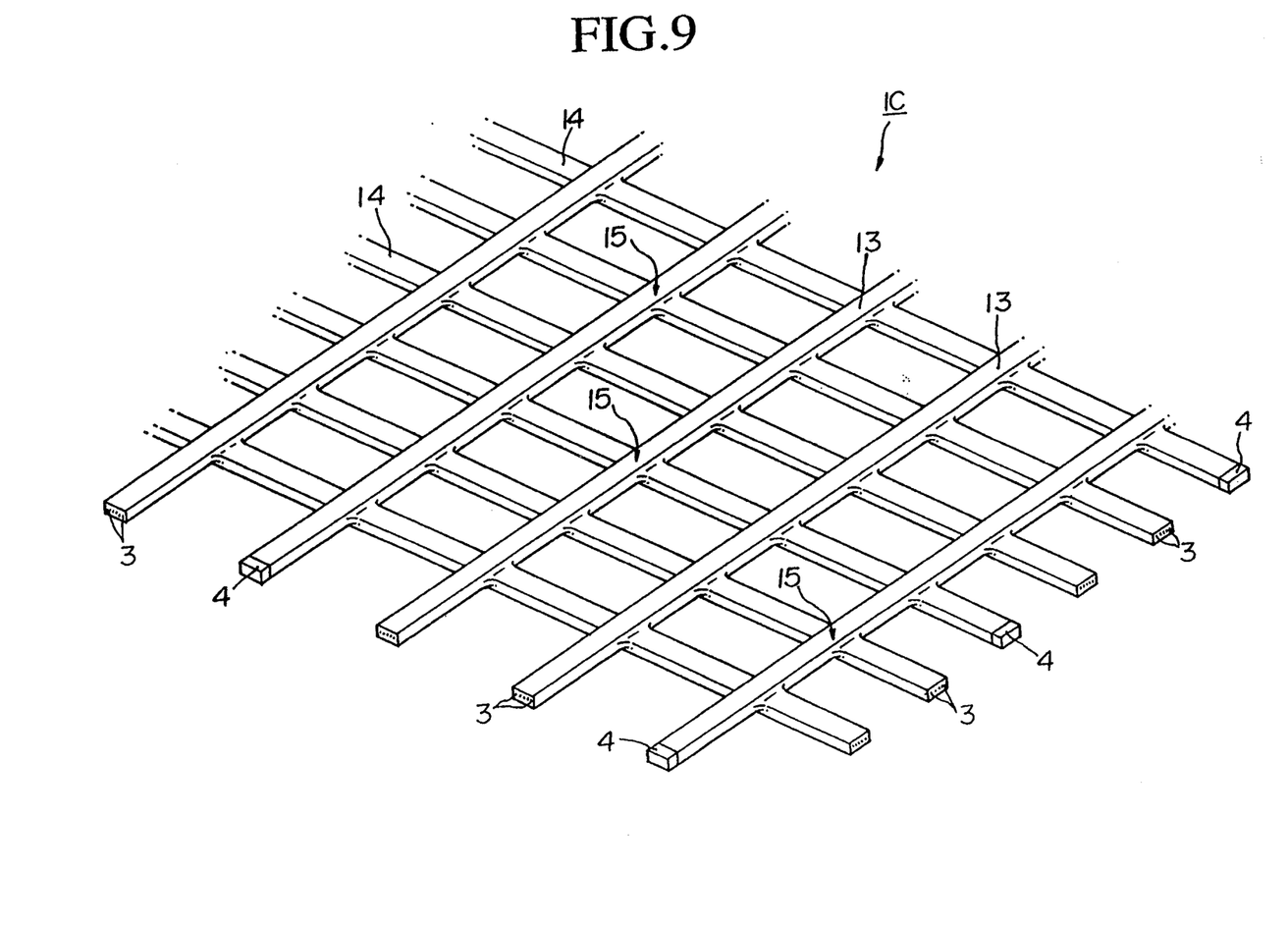
FIG. 9 is a partial perspective view showing another embodiment of the gauge according to the present invention.

FIG. 9 shows a gauge 1C which is obtained by improvement on the gauge 1B. The gauge 1C comprises a plurality of the gauge 1B constructed in the form of grille.

The gauge 1C in the form of grille comprises a plurality of vertical stripes 13, 13, . . . and a plurality of lateral stripes 14, 14, . . . intersecting the vertical stripes 13, 13, Each of the vertical stripes 13, 13, . . . and the lateral stripes 14, 14, . . . has almost the same construction as that of the above mentioned gauge 1B. The vertical stripes 13 and the lateral stripes 14 have not only the bundle of carbon fibers 3 but also bundles of glass fibers (not shown) for reinforcement of the resin materials 5. The vertical and lateral stripes 13 and 14 are unified at intersections 15, 15, . . . of these stripes. However, the bundles of carbon fibers 3 in the vertical stripes 13 are not in contact with the bundles of carbon fibers 3 in the lateral stripes 14 at the intersections 15 so that the bundles of carbon fibers 3 in the vertical stripes 13 and the bundles of carbon fibers 3 in the lateral stripes 14 intersect in three dimensions to each other through the resin materials 5. A plurality of terminals 4 for measuring the electric resistance of the bundle of carbon fibers 3 are provided on both ends of at least the desired several lines of the vertical and lateral stripes 13 and 14.

Figure 10:
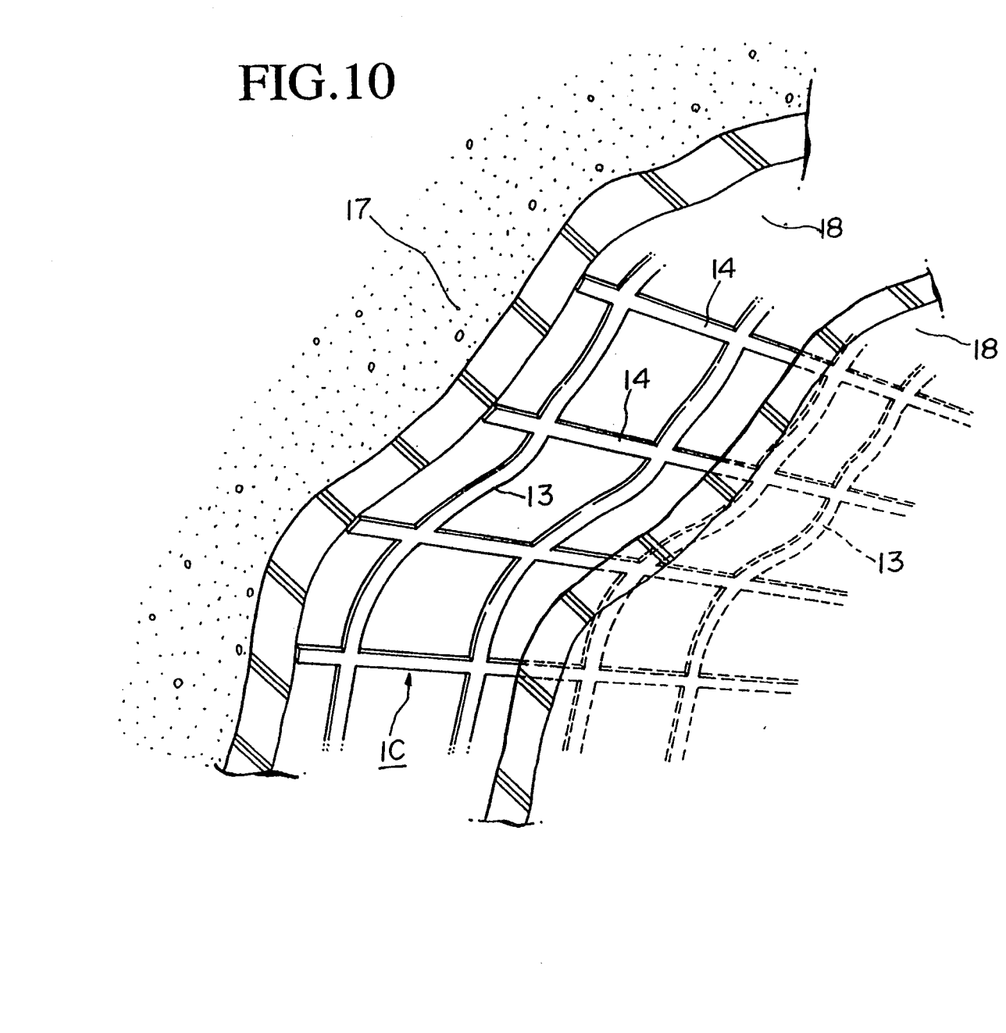
FIG. 10 is a partial perspective view with a partial section showing an enforcement mode of the gauge as shown in FIG. 9.

The gauge 1C can be used as a reinforcing member by embedding them inside a structure to be reinforced. For example, FIG. 10 shows a state of the gauge 1C which is embedded inside a pneumatically applied concrete 18 as a reinforcing member for a surface of natural ground 17. On the one hand, the gauge 1C reinforces the pneumatic applied concrete 18, on the other hand, the gauge 1C enables to know the state of strain and stress of the surface of natural ground 17 and the history of stress thereof by measuring the electric resistance value R of each the bundle of carbon fibers 3, by applying an electric current between the terminals 4. Furthermore, according to the gauge 1C, it is possible to know the distribution state of stress by measuring the electric resistance values R of a plurality of vertical and lateral stripes 13 and 14 using the vertical and lateral stripes 13 and 14 as X and Y axes. Since the gauge 1C can be embedded inside the structure, it is possible to investigate the internal strain or the internal stress directly. Consequently, it is possible to obtain data with a high reliability.

The above description presented a gauge 1C which doubles as a reinforcing member and has a two dimensional construction formed by the vertical and lateral stripes 13 and 14. However, the gauge 1C can also have a three dimensionally assembled construction which comprises axial reinforcements and reinforcements for shearing. The gauge 1C having such a construction can be embedded in a concrete or the like as a reinforcing member. In this case, the gauge is constructed so that the bundle of carbon fibers in the axial reinforcements does not touch with the gauge 1C in the reinforcements for shearing, similarly to the aforementioned gauge 1C. Terminals for applying an electric current can be formed on the bundle of carbon fibers.

The aforementioned gauge 1C has a construction in which the bundles of carbon fibers 3 in the vertical stripes 13 do not join with the bundles of carbon fibers 3 in the lateral stripes 14. These bundles of carbon fibers 3 in the vertical and lateral stripes can cross to each other, so long as both bundles of carbon fibers 3 are not in contact with each other, that is, both bundles are not connected electrically. For the sake, insulators can be provided on the crossing points (connecting points) of both bundles of carbon fibers 3. The reinforcing member of a three dimensional construction can be constructed similarly.

In the above described embodiment of the bundles of the gauge according to the present invention, only an example for detecting strain or stress of a structure has been shown. However, it will be understood that the object which may utilize the gauge is not limited to a structure, for example, it may be a simple member or the like.

In the case that the gauge is used for detecting strain or stress of the structure as described above, the structure is not limited to the beam of a bridge 8a or a surface of natural ground 17. Effectively applicable structures include any load carrying structure, e.g., a beam, a column, or a slab, in a general structure, a banking, an artificial ground, an underground continuous wall, a sheathing wall, a tunnel structure or the like.

Figure 11:
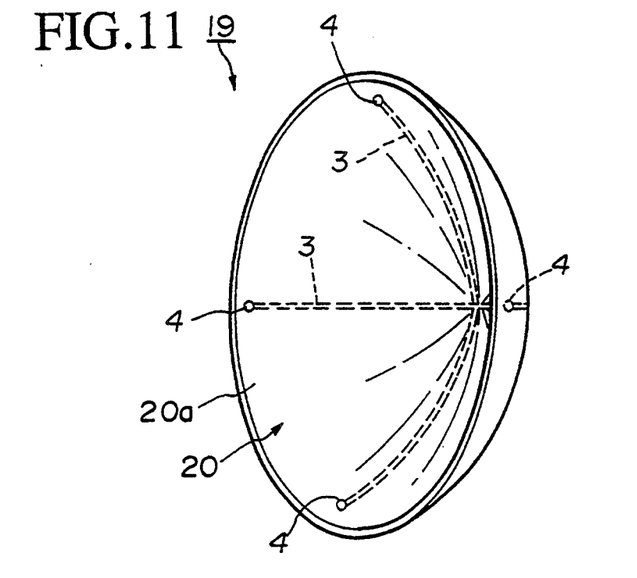
FIG. 11 is a perspective view showing an embodiment in which the plastic composite material including a bundle of fibers which has a breakdown foreknowledge mechanism according to the invention is applied to a pressure bulkhead.

FIG. 11 shows a pressure bulk-head for an airplane, which is a plastic composite material including a bundle of fibers which has a breakdown foreknowledge mechanism according to an embodiment of the present invention. The pressure bulk-head (a plastic composite material including a bundle of fibers which has a breakdown foreknowledge mechanism) 19 is provided at the tail portion of the airplane to compartment a cabin thereof airtightly so as to maintain the pressurization in the cabin.

The pressure bulk-head 19 is a hemisphere in shape similar to a pressure bulk-head for a general airplane. The pressure bulk-head 19 comprises a plastic material 20 and bundles of carbon fibers (bundles of electric conductive fibers) 3, 3 embedded inside the plastic material 20 and the whole of the pressure bulk-head 19 is formed as a unit body.

However, in the pressure bulk-head 19 of the embodiment, the plastic material 20 comprises FRP (Fiber Reinforced Plastic). The type of reinforced fibers (not shown) of FRP is not restricted. It is possible to use various types of reinforcing fibers, e.g., glass fibers, carbon fibers, boron fibers, Kevler (aramid fibers) or the like, which have been conventionally used.

Each of the bundles of electrically conductive carbon fibers 3, 3 comprises assembled plural carbon fibers. In the pressure bulk-head 19 according to the embodiment, as shown in FIG. 11, two bundles of carbon fibers 3, 3 are provided crosswise inside the plastic material 20 of a hemisphere shape. However, the two bundles of electrically conductive carbon fibers 3, 3 intersect in three dimensions with each other through the plastic material 20 so that the two bundles of carbon fibers 3, 3 are not in contact with each other at the intersection.

Terminals 4, 4 for measuring the electric resistance of the bundles of carbon fibers 3 are provided on both ends of the bundles of carbon fibers 3. The terminals 4, 4 are exposed on the external surface 20a of the plastic material 20.

Next, the function of the pressure bulk-head 19 (a plastic composite material including a bundle of fibers which has a breakdown foreknowledge mechanism) having the above-described construction and an embodiment of the method for foreknowing the state of breakdown of the structure according to the present invention will be explained as follows.

Figure 12:
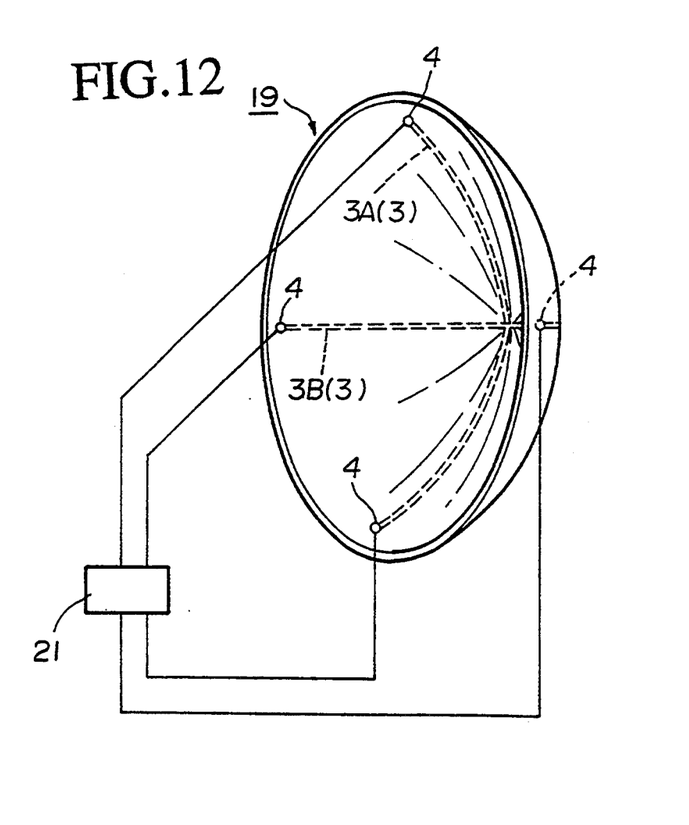
FIG. 12 is a perspective view for explaining the function of the pressure bulk-head (the plastic composite material) as shown in FIG. 1.

FIG. 12 shows the pressure bulk-head 19 with terminals 4 each of which is connected to an electric resistance detector 21. The electric resistances of the first bundle of carbon fibers 3A and of the second bundle of carbon fibers 3B are measured by the resistance detector 21.

An example experiment was carried out by the inventors using a test piece T (a plastic composite material including a bundle of fibers which has a breakdown foreknowledge mechanism) having a construction similar to that of the pressure bulk-head 19.

A test piece T used for this experiment comprises a plastic material 5 and bundles of electrically conductive carbon fibers 3 embedded inside the plastic material 5 as one body, similarly to the embodiment as shown in FIGS. 5 and 6. The plastic material 5 comprises so-called FRP which is a plastic material reinforced by reinforcing fibers (in this case, glass fibers).

The test piece T was pulled under an experimental condition similar to that of the embodiment as shown in FIGS. 5 and 6. Accordingly, a result similar to that shown in FIG. 7.

As described in the above example, when the pressure bulk-head 19 receives a pressure to generate a strain therein, the bundle of carbon fibers 3 of the pressure bulk-head 19 indicates a change in the electric resistance R as a result of the strain of the bundle of carbon fibers 3. Therefore, it is possible to detect the strain of the bundle of carbon fibers 3 to know the stress and the progress of breakdown of the pressure bulk-head 19, by measurement of the electric resistance value R of the bundle of carbon fibers 3.

Furthermore, since the bundle of carbon fibers 3 indicates a specific change of the electric resistance value R corresponding to the amount of strain $\epsilon$, as described above, it is possible to raise a warning when the electric resistance R reaches the point c (the marking point) in FIG. 7, by corresponding the rupture strength of the bundle of carbon fibers 3 to the strength of the plastic material 20, by using such a characteristic.

Since the marking point sometimes appears at a position near the rupture strength, it is preferable to make the strength of the bundle of carbon fibers 3 lower than that of the plastic material 20, so that the marking point is practically set to appear in a lower strain range.

The plastic composite material including a bundle of fibers can be used not only for a member which cannot be allowed to be destroyed, such as the pressure bulk-head 19, but it can also be used for a member which can be easily exchanged to new one when destroyed, or for a member which is used for the sake of destruction thereof. In the latter case, it is possible to raise a warning when the rupture of the bundle of carbon fibers 3 is detected, by setting the rupture strength of the bundle of carbon fibers 3 less than the strength of the plastic material 20.

The plastic composite material 5 can include non only the bundle of electrically conductive carbon fibers 3 but also a bundle of reinforcing fibers such as a bundle of glass fibers therein, similarly to the above-described test piece. The composite material may have a construction in which only the bundle of electrically conductive carbon fibers are ruptured by a stress larger than a predetermined value, while the bundle of reinforcing fibers giving strength to the plastic composite material 5, thus maintaining the shape of the composite material. Such a construction provides information for foreknowing the progress of breakdown of the composite material, using the change of the electric resistance value by the rupture of the bundle of the electric conductive fibers as the marking point.

Thus, the pressure bulk-head 19 functions as a so-called intelligent material which can judge for itself to notify the state of stress and the progress of breakdown thereof.

When the bundle of carbon fibers 3 has once been stressed to a high strain near the point of tensile rupture, the electric resistance value R shifts to a higher value. Therefore, it is possible to know whether a high strain is generated in the pressure bulk-head 19 or not, and to know the degree thereof in view of the amount of shift, so that the history of stress in the pressure bulk-head 19 can be known.

Therefore, it is possible to know the present stress occurring in the pressure bulk-head 19, or the maximum stress and the history of stress, and the like in any structural member which occurred by an external force such as an earthquake or the like. Thereby, it is useful for monitoring the strength of the pressure bulk-head 19.

In the pressure bulk-head 19 according to the above-described embodiment, the plastic composite material 20 comprises FRP. However, the plastic material 20 for the plastic composite material including a bundle of fibers according to the present invention may be one not including reinforcing fibers. For example, it is possible to provide more the bundle of carbon fibers (the bundle of the electric conductive fibers) 3 than that shown in FIG. 12 to function as reinforcing fibers for the plastic material 20. It is unnecessary to provide terminals for measuring the electric resistance for all of the reinforcing fibers, doubling as the bundle of the electric conductive fibers. It is possible to provide the terminals at only the desired bundles of conductive fibers for measuring the electric resistance.

When electric conductive fibers such as carbon fibers are used as the reinforcing fibers for the plastic material 20, as described in the above embodiment, it is necessary not to touch the bundle of electric conductive fibers with the the reinforcing fibers directly so that these are not in an electrically conductive state.

Figure 13:
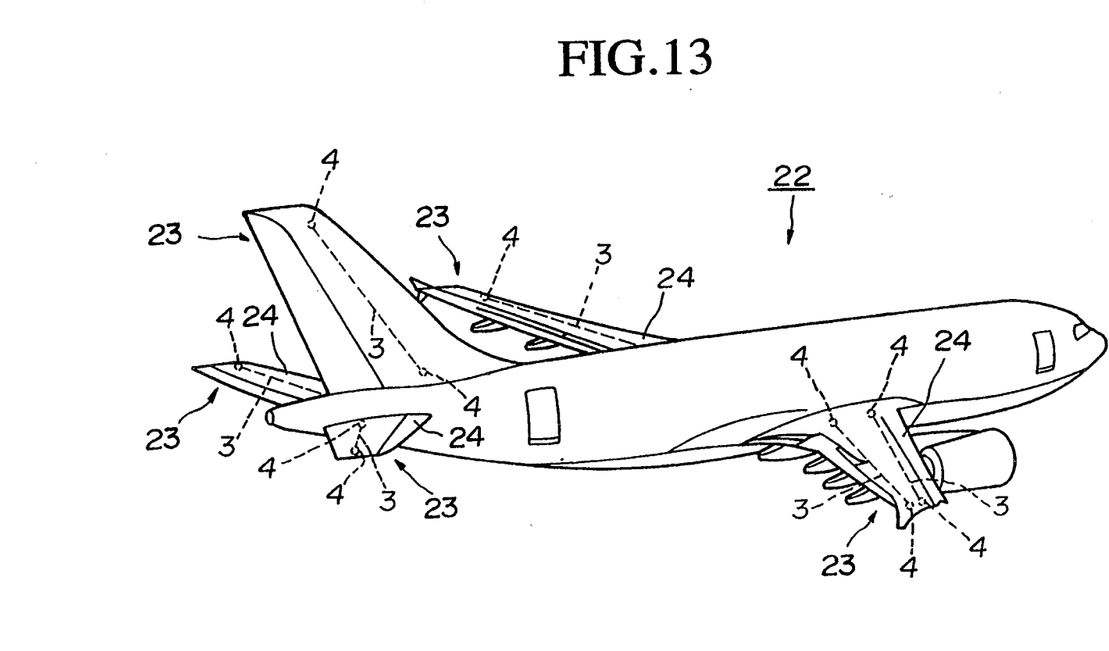
FIG. 13 is a perspective view showing another embodiment of the plastic composite material including a bundle of fibers which has a breakdown foreknowledge mechanism according to the invention.

FIG. 13 shows another embodiment of the plastic composite material including a bundle of fibers which has a breakdown foreknowledge mechanism. The embodiment is one applying the plastic composite material for wing bodies 23, 23, ... of an airplane 22.

Each of the wing bodies 23 comprises plastic material 24 and bundles of electrically conductive carbon fibers 3 provided inside the plastic material 24 as one body. At both ends of each bundle of carbon fibers 3, terminals 4, 4 for measuring electric resistance value are provided. The terminals 4, 4 of each bundle of carbon fibers 3 are connected with lead wires of a resistance detector (not shown) to measure the electric resistance of each bundle of carbon fibers 3, 3, . . .

The wing body 23 having the above-described construction functions can judge for itself to notify the state of stress, the history of stress and the progress of breakdown of the wing body 23.

The whole of the wing body 23 can be constructed by using such a plastic composite material, however, only a part of the wing body 23 also can be constructed by using the plastic composite material, in order to know the state of the stress in the whole of the wing body 23. Therefore, the plastic composite material can be distributed to desired portions of the wing body 23.

The composite material according to the present invention can be applied to not only the above-described embodiments but also the whole or any part of a member which can be constructed by plastic material, e.g., a vehicle body, a container for being applied a relatively low pressure, a structure or the like. Any of them provides effects similar to that of the above-described embodiments.

As described above, according to the present invention, it is possible to provides a gauge having a simple structure, which can be produced relatively inexpensively, by providing only terminals on the bundle of electric conductive fibers. It is possible to know the state of strain or stress of the object having the gauge, by only measuring the electric resistance of the bundle of electric conductive fibers. Furthermore, it is possible to know not only a stress at a point in time but also the history of stress, since the bundle of electric conductive fibers indicates a specific change of electric resistance occurring on the basis of strain. The characteristics enable to be useful for monitoring the strength of the structure and enable to be used for a warning means regarding the state of stress.

It is possible to set the length of the gauge freely without any restriction, and to apply the gauge for a large and long object, since the main portion of the gauge comprises a simple bundle of electric conductive fibers.

According to the method for detecting strain or stress of a structure using the gauge according to the present invention, it is possible to know the state of strain or stress in a structure, or the history of stress of the structure by using the above mentioned gauge according to the present invention. Especially, it is possible to detect the inner strain or inner stress state of the structure directly to obtain more accurate data.

It is possible to know not only a stress at a point in time but also the history of stress, since the gauge according to the present invention indicates a specific change of electric resistance occurring on the basis of strain. The characteristics enable to be useful for watching the strength of the structure and enable to be used for a warning means regarding the state of stress of the structure.

According to the plastic composite material of the present invention, it is possible to identify the state of stress or progress of breakdown of the plastic composite material non-destructively, by only measuring the electric resistance of the bundle of electric conductive fibers.

The plastic composite material having such a construction functions as a so-called intelligent material which can judge for itself to notify the progress of breakdown thereof.

According to the method for foreknowing the state of breakdown of a structure which has the above-mentioned plastic composite material according to the present invention, it is possible to identify the state of stress or progress of breakdown of a structure non-destructively. Furthermore, it is unnecessary to provide any stress detecting means such as a strain gauge except the plastic composite material.

What is claimed is:

1. A method for detecting strain or stress of a structure using a strain or stress gauge, which comprises a bundle of electrically conductive fibers and a pair of terminals provided on both ends of the bundle for measuring an electric resistance of the bundle of electrically conductive fibers, wherein the bundle of electrically conductive fibers has a characteristic of electric resistance comprising, a first stage of relatively intensive increase, a second stage of moderate increase after the first stage, and a third stage of intensive increase during load increase in a higher strain range near the point of tensile rupture, said stages accompanying an increase of the load on the bundle of electrically conductive fibers, and which characteristic comprises a shift to a higher value of resistance with respect to the initial resistance value after the load is removed; the method comprising the steps of:

preparing data of said characteristic of electric resistance of a bundle of electrically conductive fibers in a strain or stress gauge, which data includes the three stages of increase and the shift in resistance to a higher value;

applying the strain or stress gauge to the structure;

measuring the electric resistance of the bundle of electrically conductive fibers of the strain or stress gauge; and determining the approach of the maximum stress in the higher strain range near the point of tensile rupture by comparing the measurement value or the change thereof with the previously provided data of said characteristics of electric resistance, which maximum stress was applied to the bundle of electrically conductive fibers in the past.

2. A method for detecting strain or stress of a structure using a strain or stress gauge as in claim 1, wherein the bundle of electrically conductive fibers is a bundle of carbon fibers.

3. A strain or stress detecting device comprising:

a gauge for attachment to a structure, said gauge including a bundle of electrically conductive fibers, and a pair of terminals on both ends of the bundle for measuring an electric resistance of the bundle of electrically conductive fibers, wherein the bundle of electrically conductive fibers has a characteristic in which the electric resistance thereof intensively increases when the load on the fiber bundle increases in a higher strain range near the point of tensile rupture, and after the load is removed, the electric resistance has shifted to a higher value with respect to an initial resistance value; and warning means for raising a warning when the electric resistance of the bundle is in the higher strain range near the point of tensile rupture or when the bundle is broken, each of the terminals comprising a ribbon-shaped metal plate with an excellent electric conductivity and being fastened round the end of the bundle of electrically conductive fibers, the gauge being long string-shaped.

4. The strain or stress detecting device of claim 3, wherein the rupture strength of the bundle of electrically conductive fibers is set to be at most approximately equal to that of the structure.

5. The strain or stress detecting device of claim 3, wherein the gauge further comprises a plastic material in which the bundle of electrically conductive fibers is provided as one body, and the rupture strength of the bundle of electrically conductive fibers is set to be at most approximately equal to that of the plastic material.

6. The strain or stress detecting device of claim 3, wherein the gauge further comprises a plastic material in which the bundle of electrically conductive fibers and a bundle of fibers for reinforcing the plastic material are provided as one body, and the rupture strength of the bundle of electrically conductive fibers is set to be less than that of the plastic material.

7. The strain or stress detecting device of claim 3, wherein the gauge comprises a longitudinal bundle of electrically conductive fibers and a lateral bundle of electrically conductive fibers intersecting the longitudinal bundle, said bundles not being in contact with each other at the intersections, a pair of terminals are provided at both ends on each of the longitudinal and lateral bundles, and the longitudinal and lateral bundles are embedded inside a pressure bulk-head.

8. A strain or stress detecting device comprising:

a gauge for attachment to a structure, said gauge including a bundle of electrically conductive fibers, and a pair of terminals on both ends of the bundle for measuring an electric resistance of the bundle of electrically conductive fibers, wherein the bundle of electrically conductive fibers has a characteristic in which the electric resistance thereof intensively increases when the load on the fiber bundle increases in a higher strain range near the point of tensile rupture, and after the load is removed, the electric resistance has shifted to a higher value with respect to an initial resistance value; and warning means for raising a warning when the electric resistance of the bundle is in the higher strain range near the point of tensile rupture or when the bundle is broken, the gauge being in the form of a matrix which comprises a plurality of longitudinal bundles of electrically conductive fibers and a plurality of lateral bundles of electrically conductive fibers intersecting the longitudinal bundles, said longitudinal and lateral bundles not being in contact with each other at the intersections, and a plurality of terminals being provided on both ends of at least one of the longitudinal and lateral bundles, respectively.

9. The strain or stress detecting device of claim 8, wherein the matrix gauge is embedded inside applied concrete as a reinforcing member for a natural ground surface so as to detect the distribution state of stress of the natural ground surface.

10. The strain or stress detecting device of claim 8, wherein the rupture strength of the bundle of electrically conductive fibers is set to be at most approximately equal to that of the structure.

11. The strain or stress detecting device of claim 8, wherein the gauge further comprises a plastic material in which the bundle of electrically conductive fibers is provided as one body, and the rupture strength of the bundle of electrically conductive fibers is set to be at most approximately equal to that of the plastic material.

12. The strain or stress detecting device of claim 8, wherein the gauge further comprises a plastic material in which the bundle of electrically conductive fibers and a bundle of fibers for reinforcing the plastic material are provided as one body, and the rupture strength of the bundle of electrically conductive fibers is set to be less than that of the plastic material.

13. The strain or stress detecting device of claim 8, wherein the gauge comprises a longitudinal bundle of electrically conductive fibers and a lateral bundle of electrically conductive fibers intersecting the longitudinal bundle, said bundles not being in contact with each other at the intersections, a pair of terminals are provided at both ends on each of the longitudinal and lateral bundles, and the longitudinal and lateral bundles are embedded inside a pressure bulk-head.

14. A strain or stress detecting device comprising:

a gauge attached to a structure, said gauge including a bundle of electrically conductive fibers and a pair of terminals provided on both ends of the bundle for measuring an electric resistance of the bundle of electrically conductive fibers, wherein the bundle of electrically conductive fibers has a characteristic in which the electric resistance thereof intensively increases when the load between said terminals increases in a higher strain range near the point of tensile rupture, and after the load is removed, the electric resistance has shifted to a higher value with respect to the initial resistance value, each end of the bundle being sandwiched by an upper conductive member and a lower member insulated from the structure, the upper and lower members being fixed to the structure, and each upper conductive member functions as a terminal for the electric resistance measurement.

15. A plastic composite material including a bundle of fibers which has a breakdown anticipation mechanism comprising:
   a plastic material;
   a bundle of electrically conductive fibers having a predetermined shape, provided inside the plastic material as one body, wherein the bundle has a characteristic in which the electric resistance thereof intensively increases when the load on said body increases in a higher strain range near the point of tensile rupture, and after the load is removed, the electric resistance remains shifted to a higher value with respect to the initial resistance value; and
   a pair of terminals for measuring the electric resistance of the bundle of electrically conductive fibers provided on both ends thereof, the pair of terminals being exposed outside the plastic material, wherein each of the terminals comprises a ribbon-shaped metal plate with excellent electrical conductivity and is fastened round the end of the bundle of electrically conductive fibers, and the gauge is long string-shaped.

16. A plastic composite material including a bundle of fibers which has a breakdown anticipation mechanism as in claim 15, wherein the bundle of electrically conductive fibers also serves as reinforcing fibers for the plastic material.

17. A plastic composite material including a bundle of fibers which has a breakdown anticipation mechanism as in claim 15, wherein the bundle of electrically conductive fibers comprises a bundle of carbon fibers.

18. A plastic composite material including a bundle of fibers which has a breakdown anticipation mechanism as in claims 15, wherein the plastic composite material includes not only the bundle of electrically conductive fibers but also a bundle of fibers for reinforcing the plastic composite material.

* * * * *

UNITED STATES PATENT AND TRADEMARK OFFICE
CERTIFICATE OF CORRECTION

PATENT NO. : 5,379,644
DATED : January 10, 1995
INVENTOR(S) : Hiroaki Yanagida et al It is certified that error appears in the above-indentified patent and that said Letters Patent is hereby corrected as shown below:

ON THE TITLE PAGE:

"[73] Assignees: Shimizu Costruction Co., Ltd."

should be corrected to read:

--[73] Assignees: Shimizu Construction Co., Ltd.--

Signed and Sealed this

Twelfth Day of September, 1995

Attest:

BRUCE LEHMAN

*Attesting Officer*  *Commissioner of Patents and Trademarks*